United States Patent [19]

Bryan et al.

[11] Patent Number: 5,053,191

[45] Date of Patent: Oct. 1, 1991

[54] FUEL ASSEMBLY HOLDDOWN SPRING

[75] Inventors: William J. Bryan; Steven C. Hatfield, both of Granby, Conn.

[73] Assignee: Combustion Engineering, Inc., Windsor, Conn.

[21] Appl. No.: 581,795

[22] Filed: Sep. 13, 1990

[51] Int. Cl.[5] .............................................. G21C 3/32
[52] U.S. Cl. .................................... 376/446; 376/448; 376/364; 376/437
[58] Field of Search ................ 376/437, 446, 448, 364

[56] References Cited

U.S. PATENT DOCUMENTS

| | | | |
|---|---|---|---|
| 4,671,924 | 6/1987 | Gjertsen et al. | 376/285 |
| 4,793,965 | 12/1988 | Altman et al. | 376/353 |
| 4,897,241 | 1/1990 | Anthony | 376/438 |
| 4,938,919 | 7/1990 | Rylatt | 376/446 |

Primary Examiner—Brooks H. Hunt
Assistant Examiner—Meena Chelliah
Attorney, Agent, or Firm—Chilton, Alix & Van Kirk

[57] ABSTRACT

A cantilevered hold-down spring (68) for a nuclear fuel assembly (10), comprising an elongated metal bar including a substantially straight long leg portion (66) having one end adapted to be mounted (38) to a fuel assembly, an arcuate transition portion (70) at the other end of the long leg, and a straight short leg portion (76) extending from the transition portion at an acute included angle with the long leg portion, and a load transfer means (64) projecting from the straight leg intermediate the transition portion and the long leg first end. As the load on the primary loading point (80) on the transition portion increases, the load is transferred to the projection (64), thereby effectively shortening and stiffening the spring.

3 Claims, 3 Drawing Sheets

FUEL ASSEMBLY HOLDDOWN SPRING

BACKGROUND OF THE INVENTION

The present invention relates to nuclear reactors, and more particularly, to holddown springs for nuclear reactor fuel assemblies.

In most commercial nuclear power reactors, the space allocated to fuel assembly components is constrained by the other internal components of the reactor, so that only the type of fuel assembly holddown springs supplied by the original equipment manufacturer, can be used on replacement fuel assemblies. In the reactors of interest herein, each fuel assembly is vertically supported between an upper core plate and a lower core plate, and cantilever-type holddown springs are interposed between the upper core plate and the upper end fitting of the fuel assembly for biasing the assembly against the lower core plate. This bias accommodates differential thermal expansion between the assemblies and the reactor core and core plates, the upward forces imposed on the assemblies resulting from the flow of primary coolant through the core, and transient loads that can result from a variety of both normal and abnormal plant operating conditions.

In nuclear reactors where the holddown springs are of the cantilever, rather than coil or leaf spring type, it is possible that certain transients can overload the cantilever springs, such that, upon the return of the reactor to normal operation, the performance of the springs has been permanently degraded.

SUMMARY OF THE INVENTION

It is, accordingly, an object of the present invention to modify the typical cantilever spring to improve its performance under peak loading, by increasing its spring rate as increased load is applied.

In accordance with the present invention, the cantilevered spring has a secondary, or auxiliary loading point in the form of a dimple or thickened region projecting toward the upper core plate. The dimple contacts the core plate after the core plate has deflected the spring a predetermined amount via the primary loading point. The transferred, secondary loading effectively shortens and stiffens the spring against further movement of the core plate and upper end fitting toward each other.

The cantilevered spring itself, in accordance with the invention, preferably comprises a unitary, elongated metal bar having a substantially straight, long legged portion with one end adapted to be mounted to the fuel assembly end fitting, and an arcuate transition portion at the other end of the long leg. A straight short legged portion extends from the transition portion at an acute included angle with the long legged portion and has an unrestrained free end. The load transfer projection is located on the long leg intermediate the transition portion, which is the spring loading point during normal operation, and the first end adapted for attachment of the long leg to the assembly.

BRIEF DESCRIPTION OF THE DRAWINGS

These and other objects and advantages of the preferred embodiment of the invention will be described below with reference to the accompanying drawings, in which:

FIGS. 4(a), 3(b) and 3(c) illustrate the behavior of the holddown spring in accordance with the present invention, in the unloaded, normally loaded, and accident load conditions, respectively.

DESCRIPTION OF THE PREFERRED EMBODIMENT

Figures 1, 2:
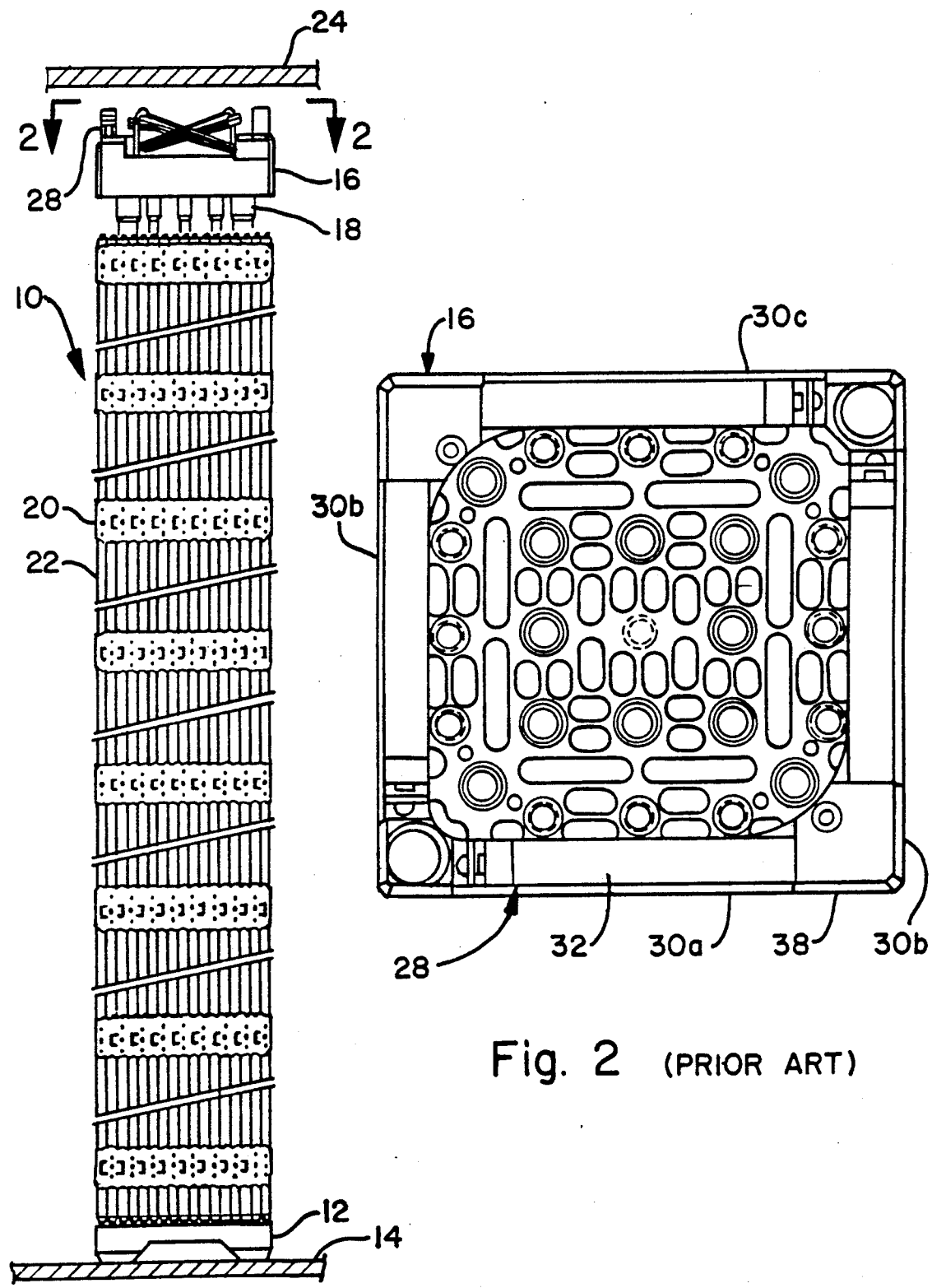
FIG. 1 is an elevation view of a typical fuel assembly with cantilevered holddown springs.
FIG. 2 is a top view of the fuel assembly upper end fitting, along lines 2—2 of FIG. 1.

FIG. 1 shows a single fuel assembly 10 having a lower end fitting 12 resting on a lower core support plate 14, an upper end fitting 16 vertically spaced from the lower end fitting 12, and a plurality of thimble tubes 18 rigidly connected to the end fittings. A plurality of vertically spaced apart grids 20 are rigidly connected to the thimble tubes 18, and define an egg crate-type structure for individually supporting a plurality of nuclear fuel rods 22, in a manner well known in the art.

On a periodic basis, for example annually, the nuclear reactor is opened, the upper core support plate 24 removed, depleted fuel assemblies 10 are removed and replaced, and the remaining assemblies are rearranged. The upper core plate 24 is then lowered onto the upper end fittings 16 so as to contact and load the cantilever spring packs 28 which define the vertically upper extent of the fuel assembly.

Figure 3A:
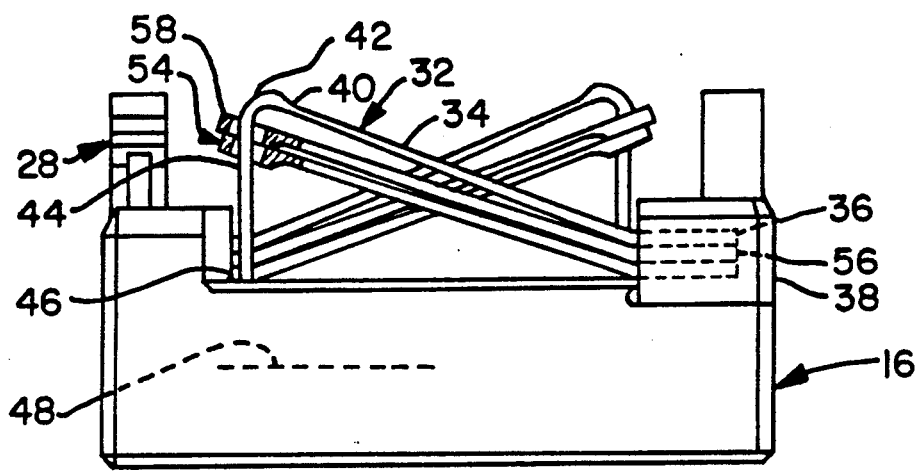
FIGS. 3(a), 3(b) and (c) illustrate the behavior of the prior art cantilever spring pack in the unloaded, normally loaded, and accident conditions, respectively.

FIGS. 2 and 3 show the upper end fitting 16 and associated cantilever spring packs 28 of the prior art, in greater detail. For purposes of the present invention, it should be appreciated that one spring pack 28 is attached along each upper rim 30a, b, c and d of the end fitting 16. Each spring pack 28 has a primary spring member 32 which is preferably a bent, unitary, substantially flat bar of varying thickness. The primary spring 32 has a straight, long leg portion 34 with one end 36 attached in a known manner to the corner bracket 38 or fixture of the end fitting, and a second end 40 defining the juncture at which the spring member begins to form the arcuate transition portion 42 which turns in the direction away from the upper core plate. A straight, short leg portion 44 typically extends vertically downward from the transition portion and has a free end 46 spaced from a stop 48 formed in the end fitting. At the juncture 40 of the second end of the long leg with the transition portion, the vertically highest elevation of the spring member 32 and of the fuel assembly is established. This serves in the prior art as the only loading point, and in the present invention as the primary loading point, against the upper core plate.

Figure 3B:
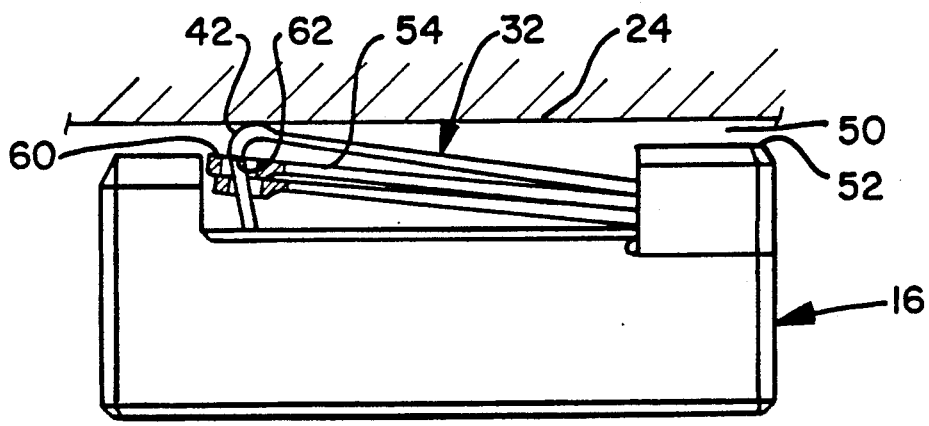
Figure 3C:
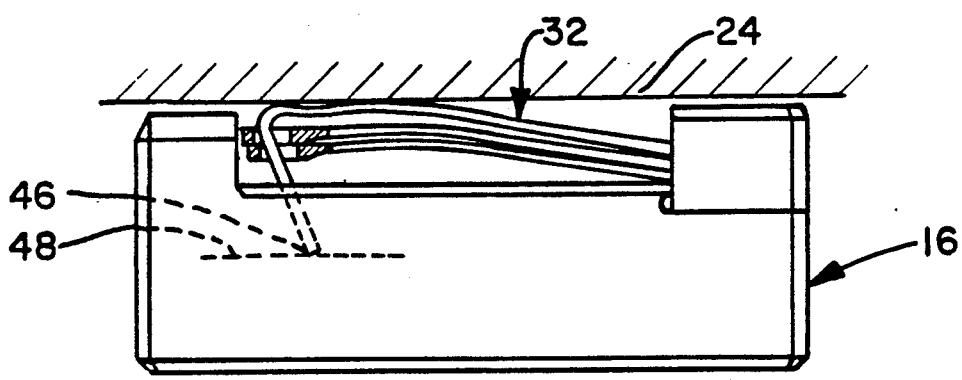

As shown in FIG. 3(b), the normal operating condition of the reactor provides a space 50 between the upper core plate 24 and the rigid frame 52 of the upper end fitting 16. During some transient conditions, as shown in FIG. 3(c), the spring can become excessively loaded so that it deforms plastically. The rigid stop surface 48 is provided in order to preclude contact between the upper core plate 24 and the upper end fitting frame 52. Such contact would directly transmit unbiased loads to the thimbles 18 shown in FIG. 1, and has the potential for damaging or distorting the thimbles or the grids 20 in a manner that could require the repair or replacement of the assembly 10 prior to the resumption of normal reactor operation.

In order to increase the stiffness in the prior art springs 32, one or more auxiliary springs 54 are provided, each of which has a first end 56 secured to the upper end fitting adjacent to the first end 36 of the primary spring 32, preferably in stacked fashion under the same corner bracket 38, and a free end 58 which extends to the vicinity of the juncture of the transition portion with the short leg portion 44 of the primary spring. At the second ends 58, the auxiliary springs have openings 60 through which the short legs pass, but the walls define openings 60 sufficiently narrow so that the walls engage downwardly facing shoulders 62 on the transition portion 42. In this manner, the secondary springs 54 provide a cantilevered, upward bias on the primary cantilevered spring 32.

It should be appreciated, however, that as shown in FIG. 3(c), the primary spring yields beyond its elastic limit during accident conditions, even before the upper core plate 24 contacts the upper end fitting 16. Moreover, the contact of the free end 46 of the short leg with the stop 48 immediately increases the rigidity of the primary spring 32, so that although the core plate does not contact the upper end fitting, the shape of the primary spring is such that the severe loading while the free end 46 is in contact with the stop 48, further permanently deforms the spring. This deformation is great enough in the prior art to degrade the performance of the spring upon return to normal operating conditions.

Figure 4A:
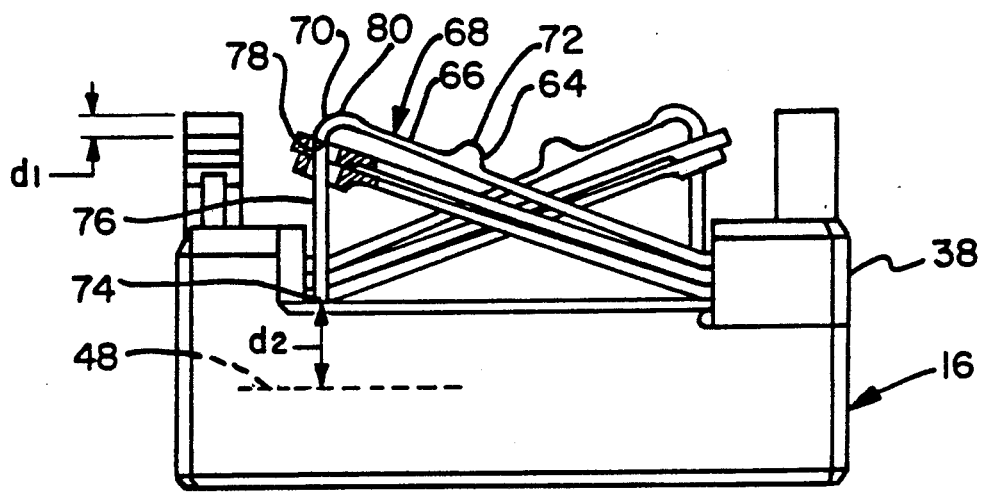
Figure 4B:
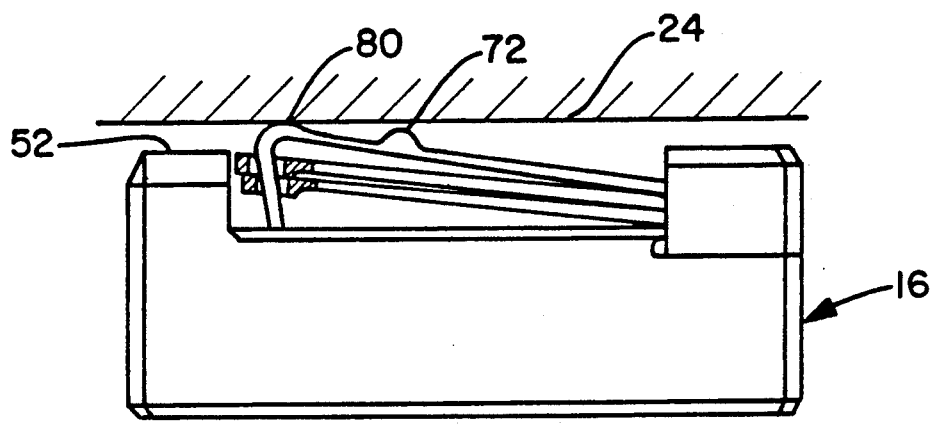
Figure 4C:
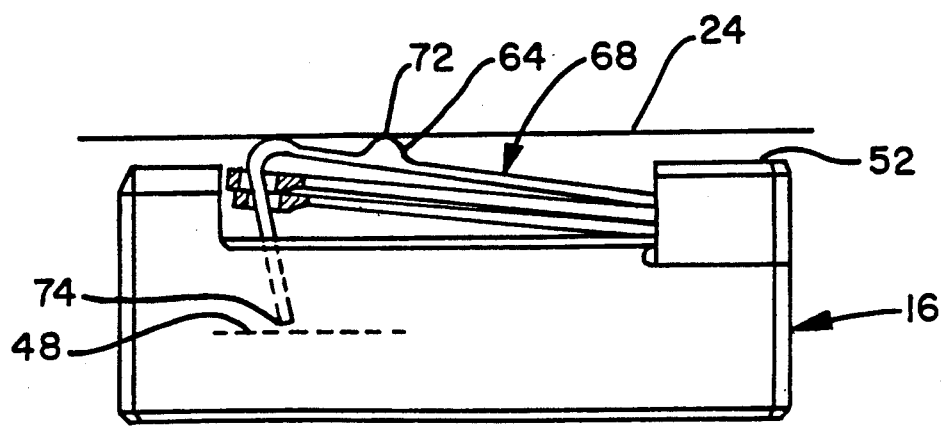

In accordance with the present invention, as shown in FIGS. 4(a)-(c), a thickening or projection 64 is formed on the upper surface of the long leg 66 of the primary spring 68, for the purpose of changing the fuel assembly holddown spring rate upon the occurrence of a known or predetermined deflection of the primary spring resulting from the movement of the core plate 24 and end fitting 16 relatively toward each other. Viewed from another aspect, the conditions under which the stiffening due to the projection occurs, directly correlates with the displacement of the primary loading point 70 downwardly toward the fuel rods.

As shown in FIG. 4(c), the contact 72 of the upper core plate with the projection 64, effectively shortens the cantilever of the primary spring 68 and thereby increases the spring rate. The increased stiffness maintains an adequate spacing between the upper core plate and the frame 52 of the upper end fitting, such that the free end 74 of the short leg 76 does not bear against the stop 48 under loads which would result in the prior art condition shown in FIG. 3(c).

The exact shape and placement of the projection 64 is to be determined by the ordinarily skilled practitioner in accordance with the particular needs of the reactor system into which the fuel assemblies will be placed. In general, however, the projection is in the form of a large dimple that is closer to the transition portion 70 of the primary spring, than it is to the rigid attachment to the bracket 38. As shown in FIG. 4(a), the vertical peak 72 of the dimple 64, is at approximately the same elevation as the shoulders 78 at the juncture between the transition portion 70 and the short leg 76 of the primary spring, when the spring is in the unloaded condition. The vertical peak of the dimple is at a lower elevation than the primary loading point 80 at the second end of the long leg. In general, the difference in elevation between the primary loading point 80 and the dimple peak 72 in the unloaded condition, indicated by $d_1$ in FIG. 4(a), is less than the distance between the free end 74 of the short leg and the stop 48 in the unloaded condition, as shown at $d_2$ in FIG. 4(a). Preferably, the distance $d_1$ will lie in the range $0.25\ d_2 \leq d_1 \leq 0.50\ d_2$.

As shown in FIG. 4(b), in the normally loaded condition, the peak 72 of the dimple remains below the elevation of the primary loading point 80, and above the elevation of the end fitting frame 52.

Although the invention as shown in the drawings provides the projection 64 in the form of a dimple, it should be appreciated that, more generally, the dimple is a special form of the thickening of the beam 66 at a point along the long leg as one follows the profile of the long leg from the primary loading point 80 toward the spring attachment point. This variation in the thickness of the long leg, allows the change of loading points, thereby decreasing the length of the cantilever beam and increasing the spring stiffness.

The present invention accommodates significantly higher spring loads under a variety of accident and start-up conditions. This improved capability is especially advantageous to the plant operators during certain reactor start-up conditions, whereby the operators may, with the benefit of the present invention, operate within a wider window, and thus achieve full power more quickly.

What is claimed is:

1. A hold-down spring for a nuclear fuel assembly, comprising: an elongated metal bar having a substantially straight long leg portion with one end adapted to be mounted to a fuel assembly, an arcuate transition portion at the other end of the long leg, a straight short leg portion extending from the transition portion at an acute included angle with the long leg portion, and load transfer means projecting from the straight leg intermediate the transition portion and the long leg first end.

2. In a nuclear fuel assembly having an upper end fitting and at least one spring pack projecting above the upper end fitting for interaction with a core upper support plate bearing on the assembly through said spring packs, the improvement wherein said spring pack comprises:

a primary spring member including a long straight leg portion having one end attached to the frame of the upper end fitting an arcuate transition portion at the other end of the long leg, and a straight short leg portion extending from the transition portion at an acute included angle with the long leg, the primary spring member being oriented on the end fitting so that the transition portion is at the vertical highest elevation, whereby movement of the end fitting and upper core plate relatively toward each other primarily loads the transition portion and deflects the long leg portion about the attachment to the end fitting frame;

at least one secondary spring having first and second end, the first end attached to the upper end fitting adjacent the first end of the primary spring long leg, and a second end terminating adjacent the transition portion, and means at the second end of the secondary spring for interacting with the transition portion to resist downward movement of the transition portion as the primary spring member deflects in a cantilever fashion;

load transfer means formed on the long leg portion intermediate the transition portion and the long leg first end, said transfer means having an elevation vertically lower than that of the primary loading point and vertically higher than the upper end fitting frame;

whereby at a known deflection of the primary spring member resulting from the movement of the core plate and end fitting toward each other, the core plate contacts the load transfer means and thereby reduces the effective length and increases the stiffness of the primary spring.

3. In a nuclear reactor having a core defined by a plurality of side by side, vertically extending, elongated nuclear fuel assemblies each having an upper end fitting, an upper core plate oriented horizontally in closely spaced relation to the upper end fittings, and a plurality of spring packs attached to the upper end fittings and cantilevered toward the core plate so as to resiliently urge the fuel assemblies against the lower core plate, said cantilevered spring having a loading point at a preset distance from the attachment point, wherein the improvement comprises the cantilevered spring having a projection toward the upper core plate which contacts the core plate when the core plate deflects the spring a predetermined amount, thereby effectively shortening and stiffening the spring against further movement of the core plate relatively toward the upper end fitting of the spring a second loading.

* * * * *